L. J. GRUBMAN AND G. A. DUDEN.
SPEED INDICATING INSTRUMENT.
APPLICATION FILED MAY 14, 1919. RENEWED NOV. 13, 1920.
1,395,638.
Patented Nov. 1, 1921.
2 SHEETS—SHEET 1.
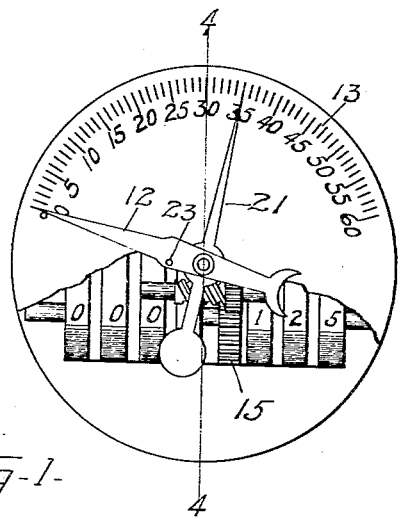
Fig-1-
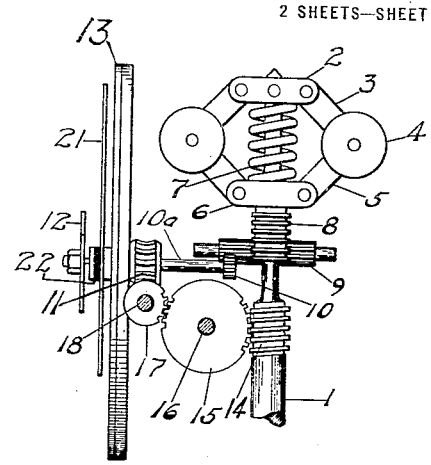
Fig-2-
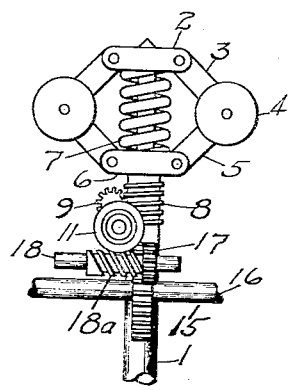
Fig-3-
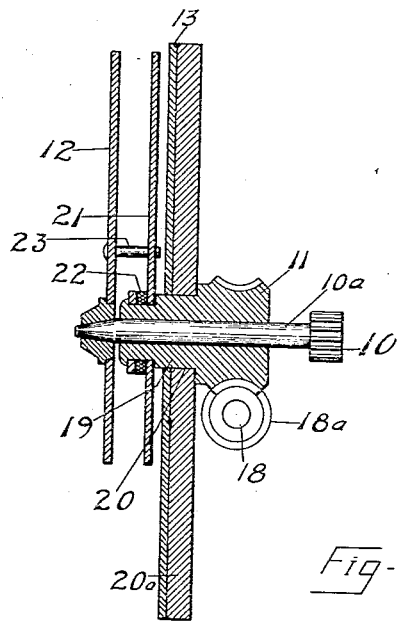
Fig-4-
Inventor
Lee J. Grubman
and
George A. Duden
By W. C. Lord
Attorney L. J. GRUBMAN AND G. A. DUDEN.
SPEED INDICATING INSTRUMENT.
APPLICATION FILED MAY 14, 1919. RENEWED NOV. 13, 1920.
1,395,638.
Patented Nov. 1, 1921.
2 SHEETS—SHEET 2.
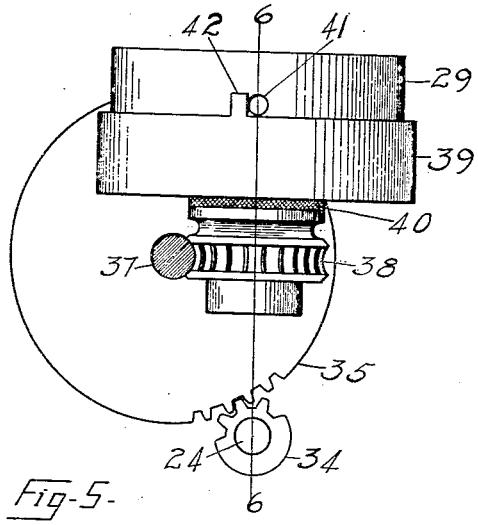
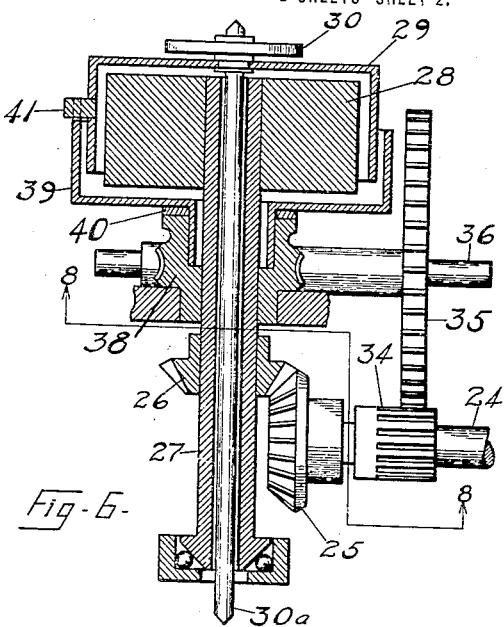
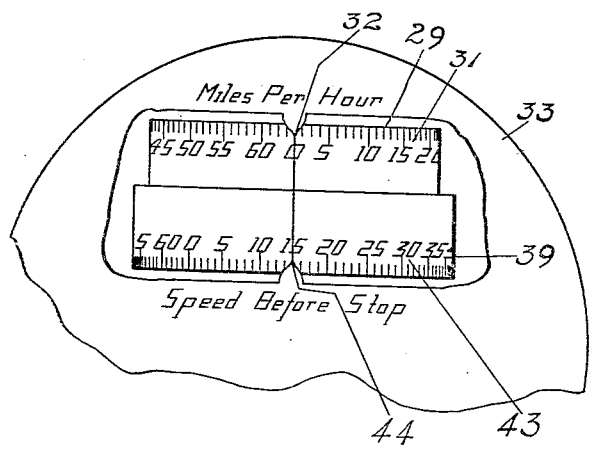
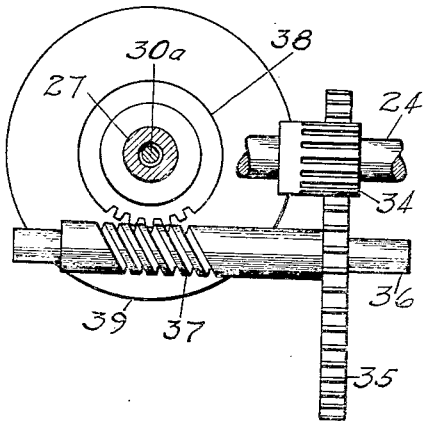
Inventor
Lee J. Grubman
and
George A. Duden
By
Attorney

UNITED STATES PATENT OFFICE.

LEO J. GRUBMAN, OF ERIE, PENNSYLVANIA, AND GEORGE A. DUDEN, OF BROOKLYN, NEW YORK.

SPEED-INDICATING INSTRUMENT.

1,395,638.  Specification of Letters Patent.  Patented Nov. 1, 1921.

Application filed May 14, 1919, Serial No. 297,013. Renewed November 13, 1920. Serial No. 423,982.

*To all whom it may concern:*

Be it known that we, LEO J. GRUBMAN and GEORGE A. DUDEN, citizens of the United States, the former residing at Erie, in the county of Erie and State of Pennsylvania, and the latter residing at Brooklyn, county of Kings, State of New York, have invented new and useful Improvements in Speed-Indicating Instruments, of which the following is a specification.

This instrument is designed more particularly to indicate speeds and to hold an approximate indication of a speed attained after a reduction of speed. One of its uses is in relation to automobiles. Here it is desirable to indicate a speed attained immediately prior, for instance, to a collision. The ordinary speedometer responding only to changes in speed returns its indicating devices to zero immediately upon the stopping of the vehicle. With our invention the device follows speed increases responding exactly to such increases in speed but returns with a decrease of speed very slowly, so slowly in fact that the indication at any one time would approximate the maximum speed at quite an appreciable distance from a collision or other stoppage of the vehicle.

The invention is illustrated in the accompanying drawings as follows:—

Figure 1 shows a front elevation of the preferable construction in which a centrifugal speed element is used.

Fig. 2 a side elevation of the device.

Fig. 3 an elevation of the speed element.

Fig. 4 an enlarged section on the line 4—4 in Fig. 1.

Fig. 5 a side elevation of an alternative construction in which a magnetic speed element is used.

Fig. 6 a vertical section on the line 6—6 in Fig. 5.

Fig. 7 a front elevation of the indicating disks.

Fig. 8 a section on the line 8—8 in Fig. 6.

The preferable construction is as follows: 1 marks the drive shaft. This is ordinarily connected to some moving part of an automobile. A centrifugal element is mounted on this driving shaft 1. It has a head 2 to which the links 3 are pivoted. Weights 4 are secured to the links 3. Links 5 connect the weights 4 with a movable head 6. A spring 7 resists the outward movement of the weights and supplements the gravity of the weights in resisting the centrifugal force of the weights as they are revolved with the driving shaft.

The head 6 has a sleeve 8 with annular gear teeth which mesh with a gear 9. The sleeve 8 rotates with the head but reciprocates with the varying speed communicating the movement of the centrifugal head to the gear 9. The gear 9 meshes with a gear 10 fixed on the shaft $10^a$. The shaft is journaled in a worm gear 11. A speed indicating hand 12 is fixed on the shaft $10^a$ and operates over a scale or dial 13.

So far this may be the ordinary speed indicating instrument commonly in use. It responds immediately to variations in speed and indicates on the dial the then instant speed whatever it may be.

That part of the speed indicating instrument which holds the reading for a short interval is as follows:—A worm 14 is arranged on the drive shaft 1 and drives a worm gear 15. The worm gear is mounted on a shaft 16 and meshes with a gear 17. The gear 17 is mounted on a shaft 18. A worm $18^a$ is mounted on the shaft 18 and drives the worm gear 11. The worm gear 11 has a hub 19 which is carried in a bearing 20 in a mounting $20^a$. A hand 21 is mounted on the hub 19 and yieldingly driven with the gear 11 by means of a friction collar 22 operating against the face of the hand at the axis.

The gearing actuating the gear 11 rotates the gear 11 in a direction to turn the hand 21 in a backward direction or toward zero as indicated on the dial. A pin 23 is carried by the hand 12 and extends inwardly a sufficient distance to engage the hand 21 as the hand 12 moves. The frictional engagement of the friction collar 22 is not sufficient to interfere with the sensitive response of the hand 12 to the speed responsive element and, therefore, the hand 21 is carried forward with the hand 12 so long as there is an increasing speed and remains with the hand 12 until the hand 12 recedes in response to a decreasing speed. When this happens there is a separation of the hands and the hand 21 then moves through the action of the gearing leading from the drive shaft to the gear 11. This, as it will be noted, is stepped down through the worms so that the speed of the return movement of the hand 21 is extremely slow as compared to the speed of the drive shaft. This may be as slow as it is desirable, the idea being that the hand 21 will return toward zero slowly so as to be in position to register within a reasonable distance the maximum speed within that distance. This may be made farther or shorter as practice may dictate but in any ordinary emergency such as a collision the hand 21 would indicate the speed approximately at the moment of collision and would indicate the maximum speed within a given distance.

In the alternative construction 24 marks the drive shaft. A beveled pinion 25 is mounted on this shaft and meshes a pinion 26 on a hollow shaft 27. A magnetic element 28 is carried by the hollow shaft 27 and influences a companion element 29, the movement of which is resisted by a spiral spring 30. The element 29 is carried by a shaft 30ª. The element 29 is in the form of a cylinder and has graduations 31 which operate in connection with a pointer 32 to indicate the instant speed. An instrument face 33 is provided.

A gear 34 is fixed on the shaft 24 and drives a gear 35. The gear 35 is mounted on a shaft 36. A worm 37 is fixed on the shaft 36 and drives a worm gear 38. The worm gear 38 drives a cylinder 39 through a friction collar 40. A lug 41 on the magnetic element 29 contacts a lug 42 on the cylinder 39. The cylinder 39 has a scale 43 which operates in connection with a pointer 44.

As the speed increases and the element 29 responds to this increase in speed the element 29 carries with it through the engagement of the lug and shoulder 42 the cylinder 39 but if there is a decrease in speed so that there is a return movement of the element 29 in response thereto the cylinder 39 does not return with the element 29 but returns only as driven through the gearing connecting the worm gear 38 with the gear 34. The operation, therefore, is similar to that of the preferred construction except for the substitution of the magnetic elements for the centrifugal elements as the speed responsive element.

What we claim as new is:—

1. In a speed indicating instrument, the combination of a driving means; a speed responsive element responsive to changes of speeds of said driving means; an indicating device responsive to movements of said speed responsive element in one direction; and mechanism acting independently of said speed responsive element for returning said indicating device with a movement starting immediately upon a reduction of speed.

2. In a speed indicating instrument, the combination of a driving means; a speed responsive element responsive to changes of speeds of said driving means; an indicating device responsive to movements of said speed responsive element in one direction; and mechanism driven directly by said driving means for returning said speed indicating device.

3. In a speed indicating instrument, the combination of a driving means; a speed responsive element responsive to changes of speeds of said driving means; an indicating device responsive to movement incident to speed increases of said speed responsive element; and mechanism driven directly by said driving means for returning said speed indicating device.

4. In a speed indicating instrument, the combination of a driving means; an element responsive to changes of speed of said means; a second element responsive through a connection to speed increases only of said means; and devices for returning said second element with any decrease of speed of said means.

5. In a speed indicating instrument, the combination of a driving means; an element responsive to changes of speed of said means; a second element responsive through a connection to speed increases only of said means; and devices for returning said second element with a decrease of speed of said means, said devices acting independently of the speed of said means.

6. In a speed indicating instrument, the combination of a driving means; an element responsive to changes of speed of said means; a second element responsive through a connection to speed increases only of said means; and devices for returning said second element with a decrease of speed of said means, said devices acting independently of the speed of said means but in relation to its actual movement.

7. In a speed indicating instrument, the combination of a driving means; an element responsive to changes of speed of said means; a second element responsive through a connection to speed increases only of said means; and devices for returning said second element with a decrease of speed of said means; said devices acting independently of the speed of said means but in relation to its actual movement and at a much slower speed than the means.

8. In a speed indicating instrument, the combination of a driving means; an element responsive to changes of speed of said means; a second element responsive through a connection to speed increases only of said means; and devices for returning said second element with a decrease of speed of said means, said devices being driven directly by said means.

9. In a speed indicating instrument, the combination of a driving means; an element responsive to speed changes of said means; a second element driven by said first element in one direction; and devices returning said second element upon any retraction of said first element independently of said first element.

10. In a speed indicating instrument, the combination of a driving means; an element responsive to speed changes of said means; a second element driven by said first element in one direction; and devices returning said second element upon a retraction of said first element independently of said first element and of the speed of said means.

11. In a speed indicating instrument, the combination of a driving means; an element responsive to speed changes of said means; a second element driven by said first element in one direction; and devices returning said second element upon a retraction of said first element independently of said first element, said devices being driven directly by said means.

12. In a speed indicating instrument, the combination of a driving means; an element responsive to speed changes of said means; a second element driven by said first element in one direction; and devices returning said second element upon a retraction of said first element independently of said first element, said devices being driven directly by said means but at a much slower speed than said means.

13. In a speed indicating instrument, the combination of a driving means; a centrifugally actuated element responsive to speed changes of said means; a second element driven by said first element in one direction; and devices returning said second element upon any retraction of said first element independently of said first element.

14. In a speed indicating instrument, the combination of a driving means; an element responsive to changes of speed actuated by said driving means; a speed indicating device actuated by said element; a second indicating device; a friction driving connection between said second indicating device and said driving means; and a driving connection between said first device and said second device adapted to actuate said second device as said first device moves in response to an increasing speed, said friction driving connection returning said second indicating device when released from said first indicating device through the retraction of said first indicating device.

15. In a speed indicating instrument, the combination of a driving means; a centrifugal head driven by said means and having a gear with annular teeth thereon; a gear actuated thereby; an indicating hand actuated by said gear; a second hand; a friction driving connection between the driving shaft and said second indicating hand giving to said hand a return movement; and means for moving said second hand with a movement of the first hand in response to an increasing speed of the driving means.

In testimony whereof we have hereunto set our hands.

LEO. J. GRUBMAN.
GEORGE A. DUDEN.